(12) United States Patent
Blood et al.

(10) Patent No.: US 7,136,457 B1
(45) Date of Patent: Nov. 14, 2006

(54) AIRCRAFT CABIN TELEPHONY TEST UNIT

(75) Inventors: Robert Michael Blood, Everett, WA (US); Abed Charamand, Upland, CA (US)

(73) Assignee: Cingular Wireless II, LLC, Atlanta, GA (US)

( * ) Notice: Subject to any disclaimer, the term of this patent is extended or adjusted under 35 U.S.C. 154(b) by 134 days.

(21) Appl. No.: 09/648,947

(22) Filed: Aug. 25, 2000
(Under 37 CFR 1.47)

Related U.S. Application Data (63) Continuation of application No. 09/648,947, filed on Aug. 25, 2000, now Pat. No. 9,460,512.

(51) Int. Cl.
*H04M 1/24* (2006.01)

(52) U.S. Cl. .............. 379/21; 379/1.01; 379/27.01; 379/29.01; 379/29.03; 379/29.04

(58) Field of Classification Search .............. 379/1.01, 379/8, 9, 15.01, 20, 21, 22.07, 26.01, 26.02, 379/27.01, 27.05, 27.06, 27.07, 28, 29.03, 379/29.04, 29.01, 29.11, 167.01, 177; 361/79, 361/65; 700/295
See application file for complete search history.

(56) References Cited

U.S. PATENT DOCUMENTS 5,754,445 A * 5/1998 Jouper et al. ............... 700/295
5,923,743 A * 7/1999 Sklar ..................... 379/167.01

* cited by examiner

*Primary Examiner*—Curtis Kuntz
*Assistant Examiner*—Barry W. Taylor
(74) *Attorney, Agent, or Firm*—Amin & Turocy, LLP (57) ABSTRACT

A test unit for an aircraft cabin telephony system includes a pair of connectors for inserting the test unit in-line within the system; an AC voltage module that is operative to indicate the presence of an AC voltage when the test unit is connected to the Cabin Delivery System connector of the cabin telephony system; a signal module that is operative to detect the presence of data signals when the test unit is connected to the Cabin Delivery System connector; a DC power module that is operative to indicate the presence of DC voltage when the test unit is connected to a seat telephony box within the cabin telephony system; and an AC current module that is operative to detect an over-current condition when the test unit is connected to the Cabin Delivery System connector of the cabin telephony system.

14 Claims, 7 Drawing Sheets

AIRCRAFT CABIN TELEPHONY TEST UNIT

CROSS-REFERENCE TO PRIOR APPLICATION

This is a continuation of application Ser. No. 09/460,512 filed on Dec. 14, 1999, to which a claim for priority is made.

BACKGROUND OF THE INVENTION

1. Field of the Invention

The present invention relates generally to test units for telephony systems, and more particularly to a test unit for an aircraft cabin telephony system.

2. Related Art

Modern commercial aircraft include telephony systems for the use of their passengers. From time to time, these systems require routine maintenance or troubleshooting. This is commonly accomplished by connecting a personal computer to the cabin telecommunications system (CTU), a lengthy and difficult process. In addition, this process requires an expensive personal computer running custom software as a diagnostic tool.

SUMMARY OF THE INVENTION

The present invention is a test unit for an aircraft cabin telephony system. According to one embodiment of the invention, the test unit includes: a pair of connectors for inserting the test unit in-line within the system; an AC voltage module that is operative to indicate the presence of an AC voltage when the test unit is connected to the Cabin Delivery System connector of the cabin telephony system; a signal module that is operative to detect the presence of data signals when the test unit is connected to the Cabin Delivery System connector; a DC power module that is operative to indicate the presence of DC voltage when the test unit is connected to a seat telephony box within the cabin telephony system; and an AC current module that is operative to detect an over-current condition when the test unit is connected to the Cabin Delivery System connector of the cabin telephony system.

According to an aspect of the invention, the test unit further includes a relay bank operative to selectively couple the AC voltage module, signal module, and DC power module to the pair of connectors as a function of the AC voltage present on the connectors.

According to another aspect of the invention, the signal module includes means for detecting the presence of E1 signals.

According to another aspect of the invention, the AC voltage module is an AC voltage detect unit having a window comparator and a current source coupled to the comparator.

According to another aspect of the invention, the signal module includes an inbound E1 signal module configured to detect the presence of inbound E1 signals and an outbound E1 signal module configured to detect the presence of outbound E1 signals.

According to another aspect of the invention, each of the E1 signal modules includes a monostable multivibrator configured to lengthen the duration of the pulses of the E1 signal.

One advantage of the present invention is that it can be applied at any point in a CTS or ACTS where a DB-15 connector is available without injuring the operator or damaging the system.

Further features and advantages of the present invention as well as the structure and operation of various embodiments of the present invention are described in detail below with reference to the accompanying drawings.

BRIEF DESCRIPTION OF THE FIGURES

The present invention will be described with reference to the accompanying drawings.

DETAILED DESCRIPTION OF THE PREFERRED EMBODIMENTS

Figure 1:
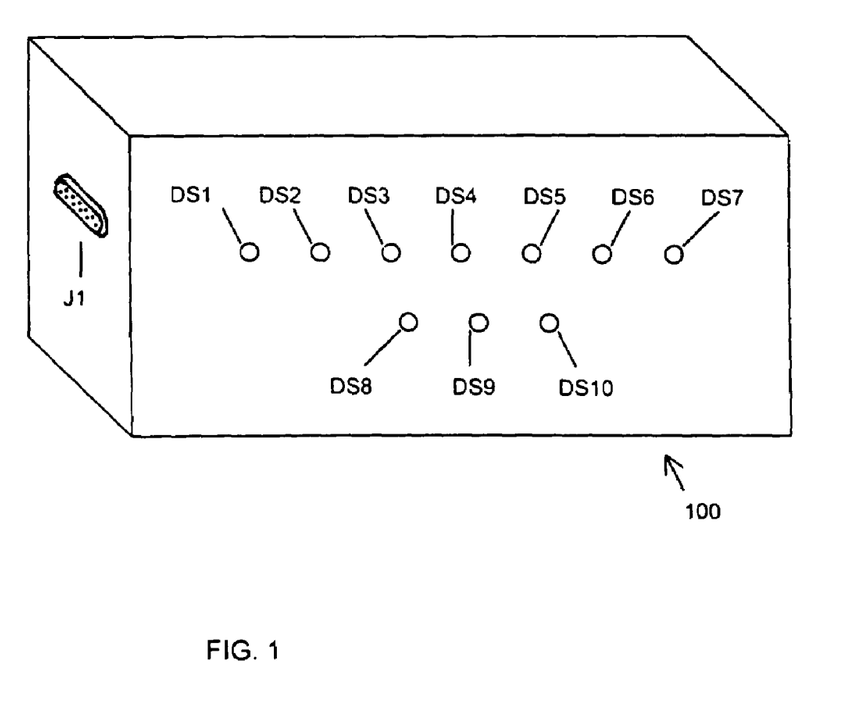
FIG. 1 depicts a test unit according to an embodiment of the present invention.

FIG. 1 depicts a test unit 100 according to an embodiment of the present invention. Test unit 100 includes two connectors J1 and P1 (illustrated in FIG. 4) for inserting test unit 100 in-line at various test points within a cabin telephony system (CTS) or advanced cabin telephony system (ACTS). Test unit 100 also includes a plurality of light-emitting diodes (LEDs) for indicating the status of the connection at the insertion test point. Test unit 100 is designed to be inserted at various points in the cabin telephony system, and to test multiple telephony functions, without damaging the cabin telephony system or the test unit.

Figure 2:
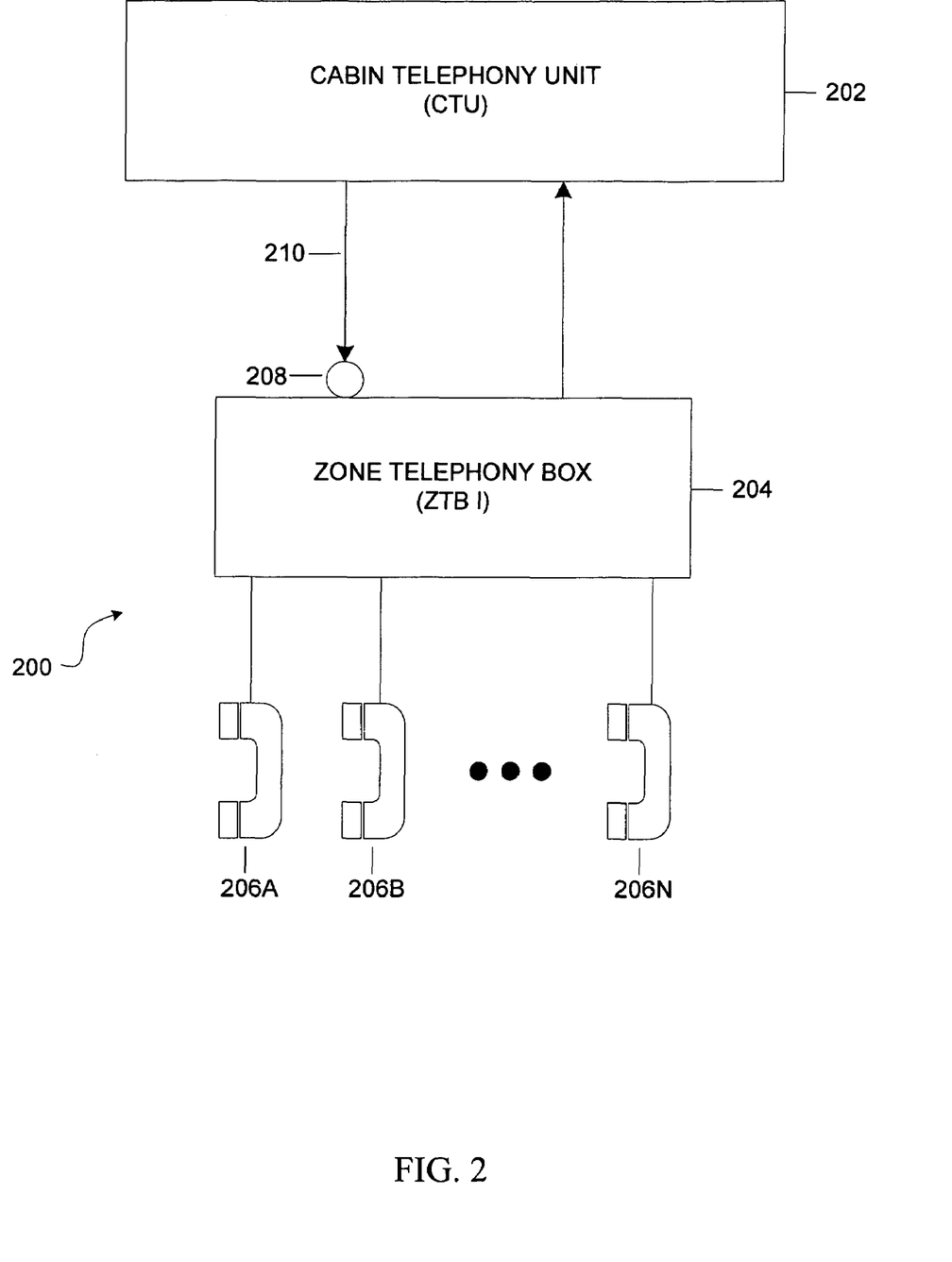
FIG. 2 is block diagram of a cabin telephony system (CTS) according to an embodiment of the present invention.

FIG. 2 is block diagram of a cabin telephony system (CTS) 200 according to an embodiment of the present invention. CTS 200 includes a cabin telephony unit (CTU) 202, a zone telephony box (ZTB) 204, and a plurality of arm rest telephones (ART) 206A through 206N. In CTS 200, ZTB 204 is of type I, and is commonly referred to as a "ZTB I", and ARTs 206 are of type I. The components of CTS 200 are well known in the relevant art.

Test unit 100 can be inserted at any point in CTS 200 where a DB15 connector is available. Referring to FIG. 2, such a connector is available at test point 208, which is located where cabin delivery system (CDS) 210 meets ZTB 1204.

Figure 3:
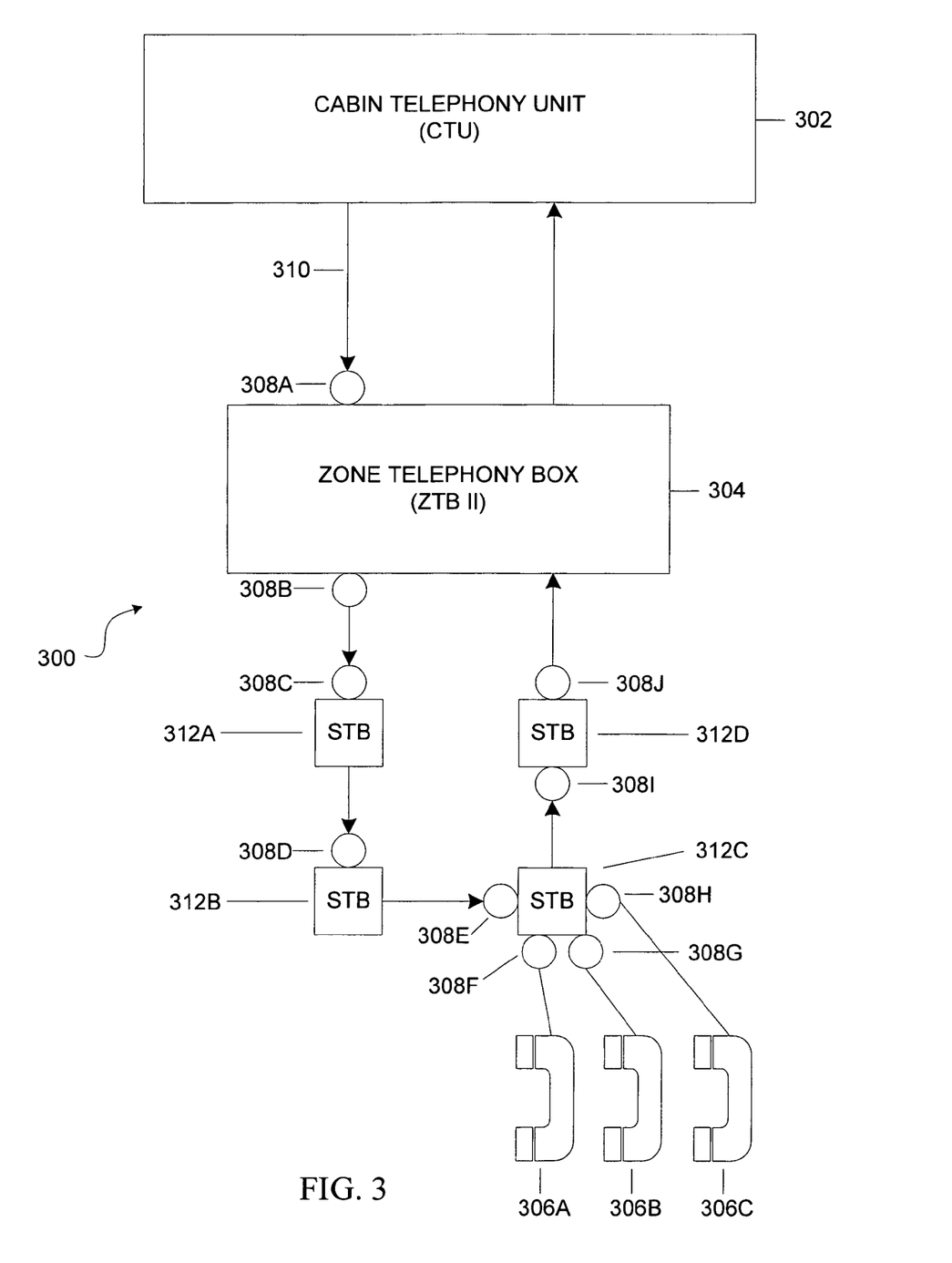
FIG. 3 is a block diagram of an advanced cabin telephony system (ACTS) according to an embodiment of the present invention.

FIG. 3 is a block diagram of an advanced cabin telephony system (ACTS) 300 according to an embodiment of the present invention. ACTS 300 includes a CTU 302, a zone telephony box (ZTB) 304, a plurality of seat telephony boxes (STBs) 312A, B, C, D, and a plurality of ARTs 306A, B, C. In ACTS 300, ZTB 304 is of type II, and is commonly referred to as a "ZTB II", and ARTs 306 are of type II or III. The components of ACTS 300 are well known in the relevant art. Referring to FIG. 3, each STB 312 can serve up to three handsets 306. ZTBII 304 can support up to four daisy chains of STB's. Each daisy chain can include up to four STB's.

Test unit 100 can be inserted at any point in ACTS 300 where a DB15 connector is available. Referring to FIG. 3, DB15 connectors are available at test points 308A through 308J. Specifically, test point 308A is located where CDS line 310 connects to ZTB II 304; test points 308C, D, E, I are located at the input of each STB 312; test point 308B is located at the output of ZTB II 304; test point 308J is located at the output of STB 312D; and test points 308F, G, H are located where any ART 306 connects to an STB.

CTS 200 and ACTS 300 deliver telephony services to aircraft passengers via ARTs 206 and 306. In these systems, the telecommunication protocol employed is E1, which is a European time-division multiple-access communication protocol that is well-known in the relevant arts.

Figure 4:
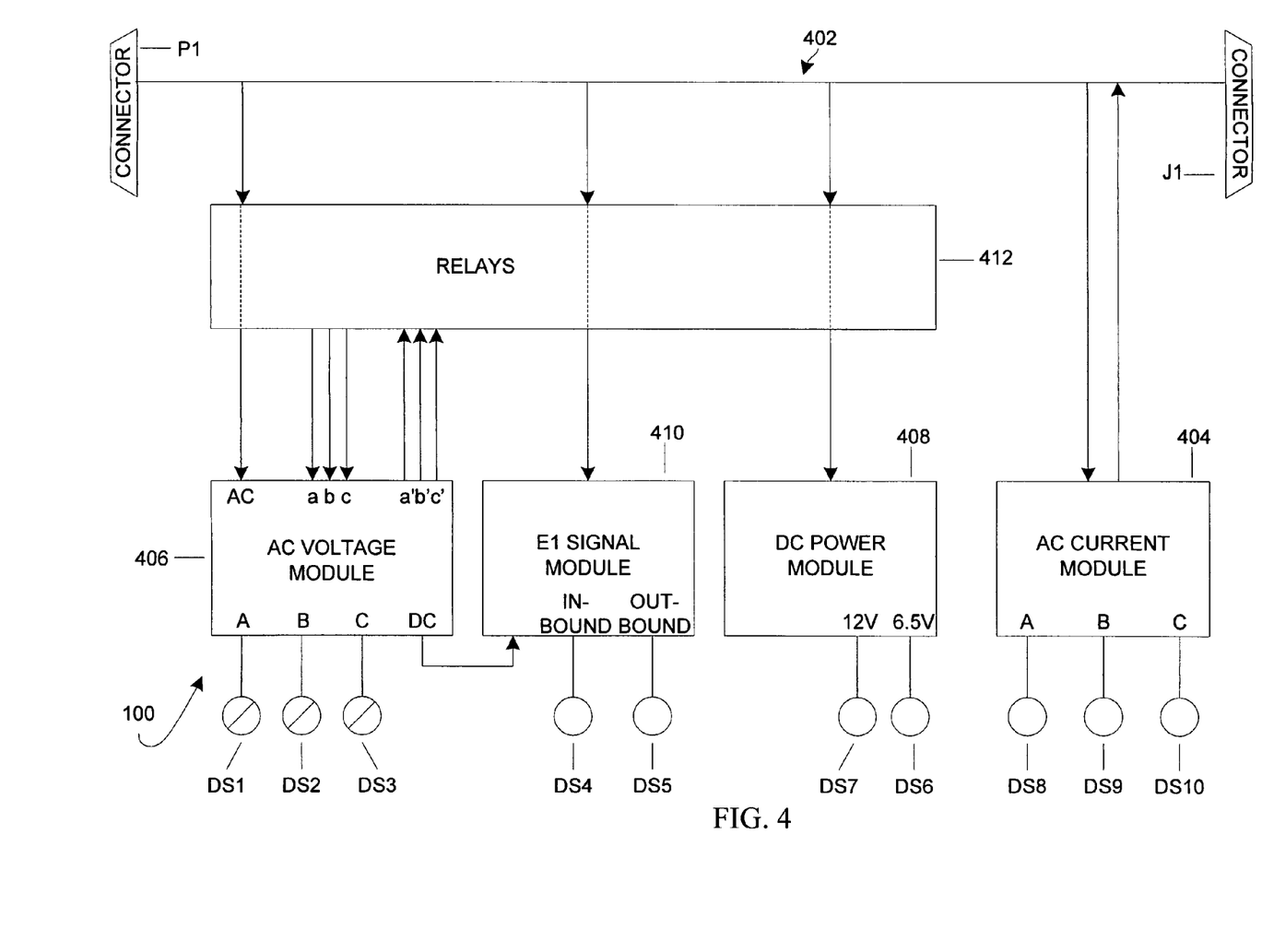
FIG. 4 is a functional block diagram of a test unit according to an embodiment of the present invention.

FIG. 4 is a functional block diagram of test unit 100 according to an embodiment of the present invention. Test unit 100 includes connectors P1 and J1. In a preferred embodiment, connector P1 is a DB15P connector, and connector J1 is a DB15S connector. Each pin of connector P1 is wired to the corresponding pin of connector J1 by one of conductors 402.

An AC current module 404 is connected in-line between pins 2, 6, and 13 of the connectors P1 and J1. Nominally, at least one of these lines will be hot when test unit 100 is inserted at test point 208 or 308A. The module 404 includes three LEDs DS8, DS9, and DS10, one for each line. When an over-current condition occurs on any of the lines, the corresponding LED is lit. An over-current condition can occur in a line when, for example, a short circuit involves the line.

Test unit 100 also includes an AC voltage module 406, a DC power module 408, and an E1 signal module 410. Modules 406, 408 and 410 are selectively coupled to particular conductors 402 by a relay bank 412. Relay bank 412 is controlled by AC voltage module 406 according to which of conductors 402 is hot, as described in detail below.

AC power may appear on any of pins 2, 5 and 13 when test unit 100 is applied at the CDS connection (test point 208 or 308A). AC voltage module 406 skims power from at least one of these three lines to provide DC power to the rest of test unit 100. However, when the test unit is applied at an STB, no AC power is present. The test unit relies on the 6.5-volt and 12-volt DC power lines at those connections.

AC voltage module 406 selectively lights three LEDs DS1, DS2 and DS3, one for each potentially hot pin. Each of LEDs DS1, DS2 and DS3 is a two-color LED. When an LED is green, power is present on the corresponding pin and is within acceptable voltage levels. When an LED is red, power is present on the corresponding pin, but not within acceptable voltage levels. When an LED is unlit, power is not present on the corresponding pin.

DC power module 408 selectively lights two LEDs to indicate the presence of DC power. DC power module 408 is coupled to pin 10 of conductors 402 by relays 412 when test unit 100 is applied to an ART port, such as test points 308B through 308J. When a 6.5-volt DC signal is present on pin 10, LED DS6 is lit. When a 12-volt DC signal is present on pin 10, LED DS7 is lit.

The signals generated by an ART microphone are sent to the CTU on the inbound signal lines. Signals directed to the earpiece of an ART travel to the ART from the CTU on the outbound signal lines. These signals are available in E1 format only at the CDS connection (test point 208 or 308A). Therefore, these functions are only operative when the test unit is connected to the CDS connection.

E1 signal module 410 receives a DC power supply from AC voltage module 406, and is selectively coupled to the inbound and outbound lines of conductors 402 by relay bank 412. E1 signal module 410 selectively lights two LEDs DS4 and DS5. When an E1 signal is present on the inbound conductor, LED DS4 is lit. When an E1 signal is present on the outbound conductor, LED DS5 is lit.

Figure 5:
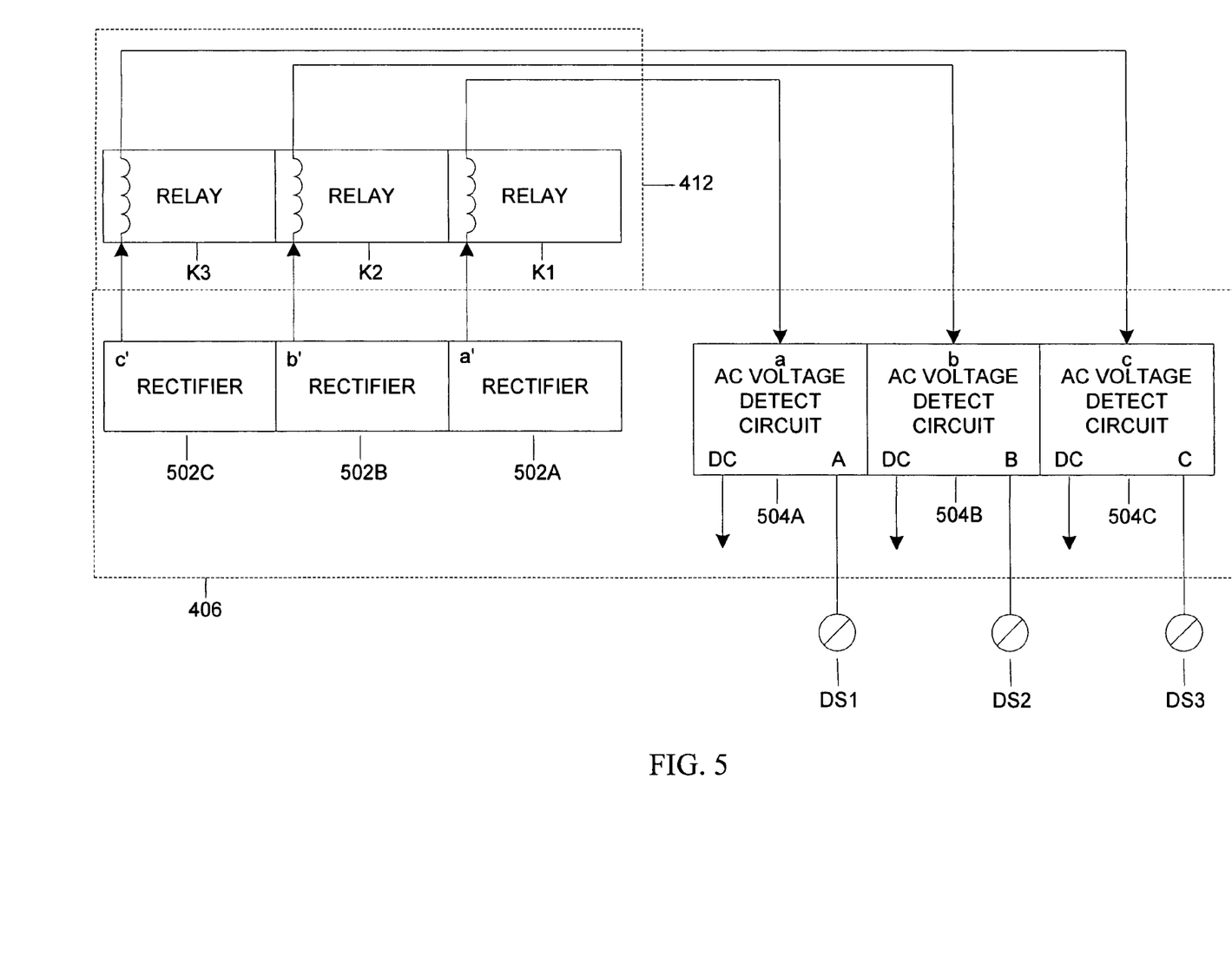
FIG. 5 is a block diagram of an AC voltage module and relays according to an embodiment of the present invention.

FIG. 5 is a block diagram of AC voltage module 406 and relays 412 according to an embodiment of the present invention. Referring to FIG. 5, AC voltage module 406 includes three bridge rectifier circuits 502A, B, C and three AC voltage detect circuits 504A, B, C. Each rectifier circuit 502 receives power from a different pair of conductors 402 and provides a DC power signal. Bridge rectifiers 502A, B, C also provide DC power signals a', b', and c', respectively.

If test unit 100 is connected at test point 308A in FIG. 3, AC voltage detect circuits 504A will monitor the AC power quality for STB loops 0 and 2. AC voltage detect circuits 504B monitors AC power quality only when the test unit is connected at test point 308A. When so connected, AC voltage detect circuit 504B monitors AC power quality for STB loops 1 and 3. AC voltage detect circuit 504C monitors AC quality when connected to any STB. These connections include test points 308B through 308J illustrated in FIG. 3.

Relay bank 412 includes three relays K1, K2 and K3. Each of DC power signals a', b', and c' energizes one of the relays K when it receives an AC voltage. When a relay K is energized, it disconnects a corresponding bridge rectifier circuit from its inputs, and instead connects these inputs to one or more of the modules of test unit 100.

Figure 6A:
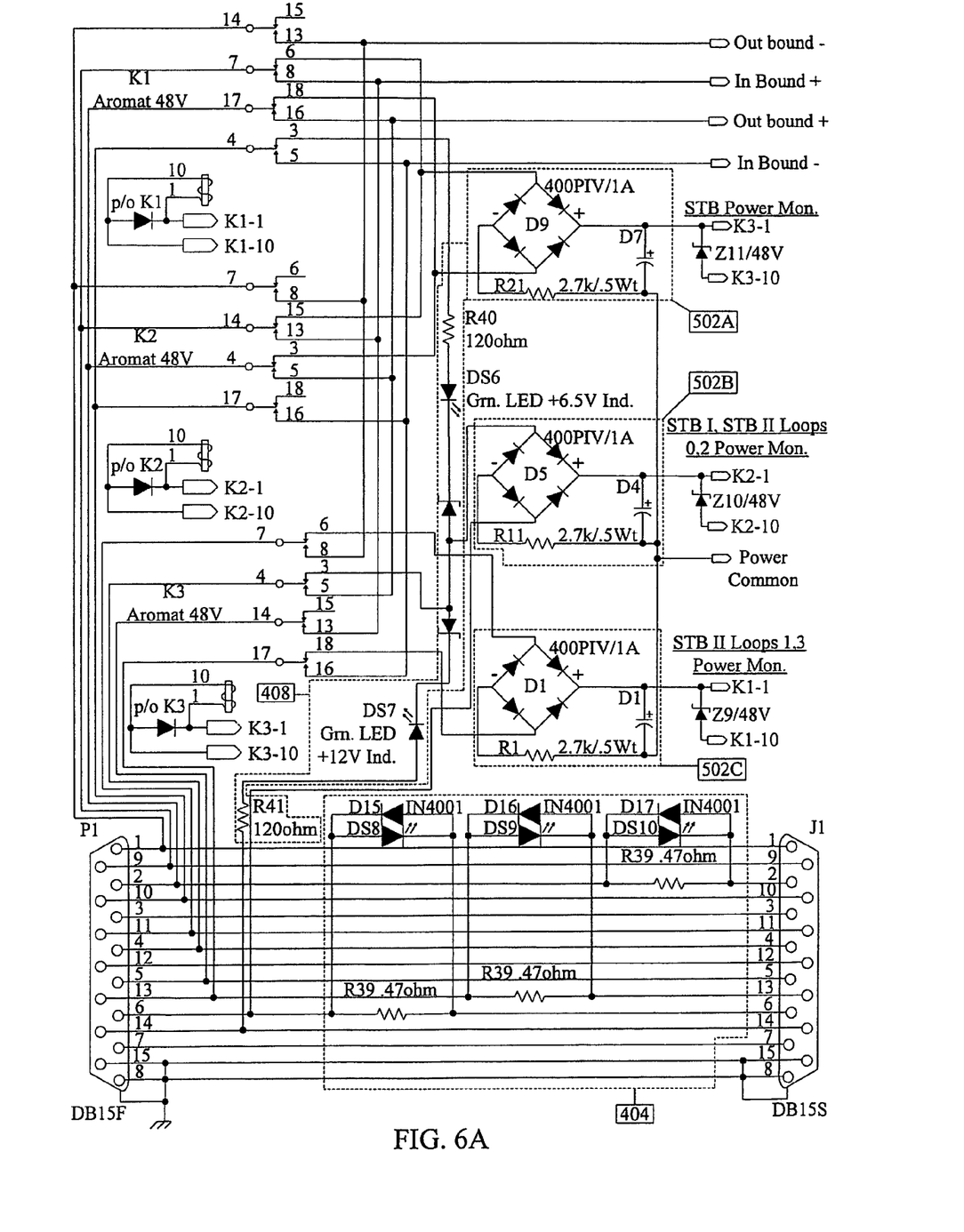
FIGS. 6A and 6B present an electrical schematic diagram of a test unit according to an embodiment of the present invention.
Figure 6B:
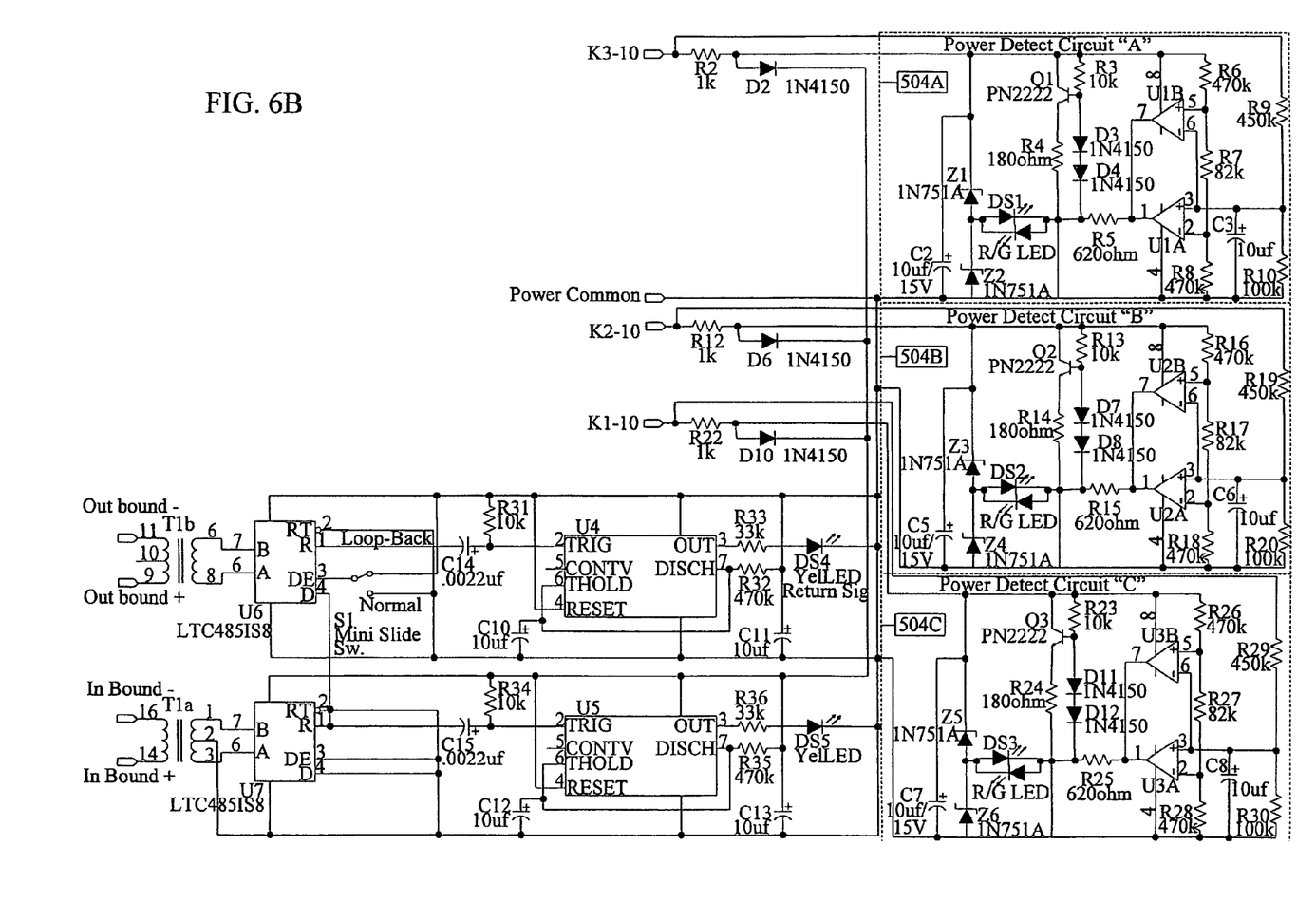

FIGS. 6A and 6B present an electrical schematic diagram of test unit 100 according to an embodiment of the present invention.

As mentioned above, test unit 100 includes three AC current modules 404, one for each possibly hot lead (leads 2, 6 and 13). Each AC current module 404 includes an LED DS8, DS9 or DS10, a resistor R37, R38, or R39, and a diode D15, D16, or D17, connected in parallel, respectively, as shown in the detail of FIG. 6A.

As mentioned above, AC voltage module 406 includes three bridge rectifier circuits 502A, B, C, shown in more detail in FIG. 6A. Each bridge rectifier 502 provides 26.4 DC volts when the corresponding power line is at 115 volts AC. When input power is within six volts of 115 volts AC, the corresponding LED is green. When power is present, but is not within 6 volts of 115 volts AC, the corresponding LED is red. When no power is present, the corresponding LED is not lit.

As mentioned above, AC voltage module 406 includes three AC voltage detect circuits 504A, B, C, shown in more detail in FIG. 6B. AC voltage detect circuit 504A is now discussed in detail; AC voltage detect circuits 504B and 504C are substantially similar.

AC voltage detect circuit 504A includes two comparators U1 in a window comparator configuration. In a preferred embodiment, comparators U1 are implemented as an LMC677AIM unit, which is commercially available. The circuit also includes a current source comprising transistor Q1, diodes D3 and D4, and resistors R3, R4 and R5. Two Zener diodes are provided to establish reference voltage for the power detecting circuit, and also to provide a midpoint voltage for LED DS1.

Referring to FIG. 6A, DC power module 408 includes resistors R40 and R41, Zener diodes Z7 and Z8, and LEDs DS6 and DS7. Green LED DS6 is lit when 6.5 volts DC is present. Green LED DS7 is lit when 12 volts DC is present.

Referring to FIG. 4, as mentioned above, test unit 100 includes an E1 signal module 410. E1 signal module 410 includes two modules: an inbound signal detect module and an outbound signal detect module, which are further illustrated in FIG. 6B. The inbound signal detect module detects the presence of inbound signals (that is, signals traveling toward the CTU). The outbound signal detect module detects the presence of outbound E1 signals (that is, signals leaving the CTU).

E1 signals include pulses of very short duration. Therefore, each E1 signal detect module includes a monostable multi-vibrator U4, U5 to lengthen each pulse, as shown in FIG. 6B. Each pulse is lengthened to approximately 15 milliseconds in a preferred embodiment. In a preferred embodiment, each of U4 and U5 are implemented as an LMC555CM unit, which is commercially available.

Each E1 signal detect module is coupled to the signal lines among conductors 402 (FIG. 4) inductively by a transformer T1 and by an RS45 communications chip U6, U7, as shown in FIG. 6B. Transformer T1 isolates the cabin telephony system circuitry, which is at air-frame ground, from the test module test unit circuit, which is at local ground. In a preferred embodiment, T1 is matching transformer.

When signals are present, the corresponding E1 signal detect module lights an LED DS4, DS5, as illustrated in FIGS. 4 and 6B. Inbound E1 signal detect module includes a switch S1 (FIG. 6B) which is normally in a "normal" setting for detection of inbound signals. When switch S1 is thrown to "loop-back" mode, signals received from the inbound signal lines are transmitted over the outbound signal lines.

In a preferred embodiment, RS45 communication units U6, U7 are implemented as LTC485IS8 chips, which are commercially available components.

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

The invention claimed is:

1. A test unit for an aircraft cabin telephony system, comprising:
   a pair of connectors for inserting the test unit in-line within the system;
   an AC voltage module operative to indicate the presence of an AC voltage when the test unit is connected to a Cabin Delivery System connector of the cabin telephony system;
   a signal module operative to detect the presence of data signals when the test unit is connected to the Cabin Delivery System connector;
   a DC power module operative to indicate the presence of DC voltage when the test unit is connected to a seat telephony box within the cabin telephony system; and
   an AC current module operative to detect an over-current condition when the test unit is connected to the Cabin Delivery System connector of the cabin telephony system.

2. The test unit of claim 1, further comprising:
   a relay bank operative to selectively couple the AC voltage module, signal module, and DC power module to the pair of connectors as a function of the AC voltage present on the connectors.

3. The test unit of claim 2, wherein the signal module comprises means for detecting the presence of E1 signals.

4. The test unit of claim 3, wherein the AC voltage module comprises:
   an AC voltage detect unit having
   a window comparator, and
   a current source coupled to the comparator.

5. The test unit of claim 4, wherein the signal module comprises:
   an inbound E1 signal module configured to detect the presence of inbound E1 signals; and
   an outbound E1 signal module configured to detect the presence of outbound E1 signals.

6. The test unit of claim 5, wherein each of the E1 signal modules comprises:
   a monostable multivibrator configured to lengthen the duration of the pulses of the E1 signal.

7. A method of testing a cabin telephony system, comprising:
   removably connecting a portable test unit to a cabin delivery system connector of the cabin telephony system;
   indicating a presence of an AC voltage when the test unit is connected to the cabin delivery system connector of the cabin telephony system;
   detecting a presence of data signals when the test unit is connected to the cabin delivery system connector;
   indicating a presence of DC voltage when the test unit is connected to a seat telephony box of the cabin telephony system; and
   detecting an over-current condition when the test unit is connected to the cabin delivery system connector.

8. The method of claim 7, wherein:
   the cabin delivery system connector is located at the junction of a cabin delivery system and a zone telephony box.

9. The method of claim 7, wherein:
   the test unit includes an AC voltage module, an E1 signal module, a DC power module, and a pair of connectors, and further comprising the step of:
   selectively coupling the AC voltage module, the E1 signal module, and the DC power module to the pair of connectors as a function of the AC voltage present on the pair of connectors.

10. The method of claim 9, further comprising the step of:
    detecting the presence of inbound E1 signals.

11. The method of claim 10, further comprising the step of:
    detecting the presence of outbound E1 signals.

12. The method of claim 9, wherein:
    the AC voltage module includes a plurality of voltage detect units, wherein each of the plurality of voltage detect units includes a window comparator and a current source coupled to the window comparator.

13. The method of claim 9, wherein:
    the E1 signals include pulses having a duration, and further comprising the step of: lengthening the duration of the pulses.

14. A test unit for a cabin telephony system, comprising:
    means for indicating a presence of an AC voltage when a test unit is connected to a cabin delivery system connector of the cabin telephony system;
    means for detecting a presence of data signals when the test unit is connected to the cabin delivery system connector;
    means for indicating a presence of DC voltage when the test unit is connected to a seat telephony box of the cabin telephony system; and
    means for detecting an over-current condition when the test unit is connected to the cabin delivery system connector.

* * * * *

UNITED STATES PATENT AND TRADEMARK OFFICE
CERTIFICATE OF CORRECTION

PATENT NO. : 7,136,457 B1  Page 1 of 1
APPLICATION NO. : 09/648947
DATED : November 14, 2006
INVENTOR(S) : Robert Michael Blood et al.

It is certified that error appears in the above-identified patent and that said Letters Patent is hereby corrected as shown below:

Title Page item 63 please change:

"Continuation of application No. 09/648,947, filed on Aug. 25, 2000, now Pat. No. 9,460,512."

to

"Continuation of application No. 09/460,512, filed on Dec. 14, 1999, now abandoned."

Signed and Sealed this

Thirty-first Day of March, 2009

JOHN DOLL
*Acting Director of the United States Patent and Trademark Office*